US011860507B2

(12) United States Patent
Chen et al.

(10) Patent No.: US 11,860,507 B2
(45) Date of Patent: Jan. 2, 2024

(54) CASCADED FOCUSING AND COMPRESSING POSTCOMPRESSION SYSTEM AND METHOD THEREOF

(71) Applicant: NATIONAL TSING HUA UNIVERSITY, Hsinchu (TW)

(72) Inventors: Ming-Chang Chen, Hsinchu County (TW); Ming-Shian Tsai, Chiayi (TW); An-Yuan Liang, Kaohsiung (TW); Chia-Lun Tsai, Taipei (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 24 days.

(21) Appl. No.: 17/456,645

(22) Filed: Nov. 29, 2021

(65) Prior Publication Data

US 2023/0168562 A1 Jun. 1, 2023

(51) Int. Cl.
*G02F 1/35* (2006.01)
*G02B 17/02* (2006.01)

(52) U.S. Cl.
CPC .................. *G02F 1/3501* (2013.01)

(58) Field of Classification Search
CPC .................................................. G02F 1/3501
See application file for complete search history.

(56) References Cited

U.S. PATENT DOCUMENTS

| | | | | |
|---|---|---|---|---|
| 4,655,547 A * | 4/1987 | Heritage | ............ | B23K 26/0652 |
| | | | | 359/566 |
| 5,956,173 A * | 9/1999 | Svelto | .................. | G02F 1/3513 |
| | | | | 359/332 |
| 9,219,344 B2 * | 12/2015 | Zhang | .................. | G02F 1/3513 |
| 9,678,405 B2 * | 6/2017 | Mironov | ............ | G02B 27/0927 |
| 9,847,615 B2 * | 12/2017 | Russbueldt | ........... | H01S 3/0057 |
| 2011/0299152 A1 * | 12/2011 | Mourou | ................ | H01S 3/0057 |
| | | | | 359/327 |
| 2012/0002269 A1 | 1/2012 | Tempea | | |
| 2021/0333683 A1 * | 10/2021 | Zaouter | ................ | G02F 1/3507 |

FOREIGN PATENT DOCUMENTS

| | | |
|---|---|---|
| CN | 111600190 A | 8/2020 |
| WO | 2020/074827 A2 | 4/2020 |

OTHER PUBLICATIONS

I Ahmad et al., "Redshift of few-cycle infrared pulses in the filamentation regime", New Journal of Physics, published on Sep. 1, 2011, vol. 13, No. 9 (093005), pp. 1-12, published by IOP Publishing, United Kingdom.
Marcus Seidel et al., "Factor 30 pulse compression by hybrid multi-pass multi-plate spectral broadening", submitted on Nov. 24, 2021, e-print, accessed at https://arxiv.org/pdf/2111.12834v1.pdf, United States.

* cited by examiner

*Primary Examiner* — Daniel Petkovsek
(74) *Attorney, Agent, or Firm* — CKC & Partners Co., LLC

(57) ABSTRACT

A cascaded focusing and compressing postcompression system includes at least one CASCADE (cascaded focusing and compressing) module. The CASCADE module includes a focusing unit and a compressing unit. The focusing unit is for nonlinear broadening a bandwidth of the light pulses. The compressing unit is for shortening a pulse duration of the light pulses.

14 Claims, 16 Drawing Sheets

CASCADED FOCUSING AND COMPRESSING POSTCOMPRESSION SYSTEM AND METHOD THEREOF

BACKGROUND

Technical Field

The present disclosure relates to a postcompression system and a method thereof. More particularly, the present disclosure relates to the postcompression system and the method thereof which can broaden the bandwidth and compress the pulse duration of the light pulses.

Description of Related Art

Postcompression has been applied in various fields such as coherent supercontinuum generation, optical coherence tomography, frequency metrology, fluorescence lifetime imaging, spectroscopy, and few-to-single-cycle pulse generation. Among them, few-cycle pulse generation opens a new insight to ultrafast fields, including lightwave electronics, ultrafast spectroscopy, particle acceleration and attosecond science. Especially high-harmonic generation, driven by intense short pulses, provides a simple, compact table-top extreme ultraviolet (EUV) source to capture the fastest electronic, magnetic, topological, molecular, and quantum excitations at the nanoscale. In the temporal aspect, few-to-single-cycle pulse plays a central role in high-harmonic generation, which not only produces higher photon energy, but also reduces attosecond bursts from multiple to single in a repetition period.

In postcompression, it is based on a nonlinear interaction, typically self-phase modulation, to increase the spectral bandwidth, while the pulse chirp could be removed by dispersion compensation for shortening the pulse duration. Currently, three arrangements can produce millijoule-level few-cycle pulses: hollow-core waveguide, multiple thin plates, and multi-pass cell.

In the hollow-core waveguide method, light pulses are coupled into a waveguide in order to increase the interaction length between the light pulses and the medium, achieving a larger bandwidth of nonlinear broadening. However, intense pulses may cause damage to the waveguide. The coupling and guidance loss decreases the power transmission, degrading the overall conversion efficiency. Furthermore, the hollow-core waveguide method may cause high-order spectral phases during a high nonlinear broadening process, which is not easy for dispersion engineering.

In the multiple thin plates method, a light pulse with high energy passes through a series of thin solid plates to achieve larger bandwidth of the light pulse. However, the thin solid plates can be easily damaged by a high-energy light pulse so that the system is not stable. Furthermore, utilizing the self-focusing effect to refocus beams on plates periodically would cause spatial wave-front distortion, influencing the focus quality.

The technique of the multi-pass cell is based on a Herriot cavity. The light pulses can be refocused in each reflection by the concave mirrors to increase the interaction between the light pulses and the medium. However, the conversion efficiency and the spectral bandwidth of the light pulses are very limited by the coating technology of the concave mirrors in the Herriott cell.

Therefore, the postcompression system that can efficiently produce high-energy few-cycle pulses is still a grand challenge for practitioners.

SUMMARY

According to an embodiment of the present disclosure, light pulses pass through a cascaded focusing and compressing postcompression system and the cascaded focusing and compressing postcompression system includes at least one CASCADE (cascaded focusing and compressing) module. The CASCADE module includes a focusing unit and a compressing unit. The focusing unit is for nonlinear broadening a bandwidth of the light pulses. The compressing unit is for shortening a pulse duration of the light pulses.

According to another embodiment of the present disclosure, a cascaded focusing and compressing postcompression method includes a pulse providing step, and a CASCADE step. The pulse providing step is performed to provide light pulses. The CASCADE step is performed to dispose at least one CASCADE module for focusing and compressing the light pulses and includes a focusing step and a compressing step. The focusing step is performed to nonlinear broaden a bandwidth of the light pulses via a focusing unit of the at least one CASCADE module, wherein a light path of the light pulses passes through the focusing unit. The compressing step is performed to shorten a pulse duration of the light pulses via a compressing unit of the at least one CASCADE module.

DETAILED DESCRIPTION

It will be understood that when an element (or mechanism or module) is referred to as being "disposed on", "connected to" or "coupled to" another element, it can be directly disposed on, connected or coupled to the other elements, or it can be indirectly disposed on, connected or coupled to the other elements, that is, intervening elements may be present. In contrast, when an element is referred to as being "directly disposed on", "directly connected to" or "directly coupled to" another element, there is no intervening element present.

In addition, the terms first, second, third, etc. are used herein to describe various elements or components, these elements or components should not be limited by these terms. Consequently, a first element or component discussed below could be termed a second element or component.

Figure 1A:
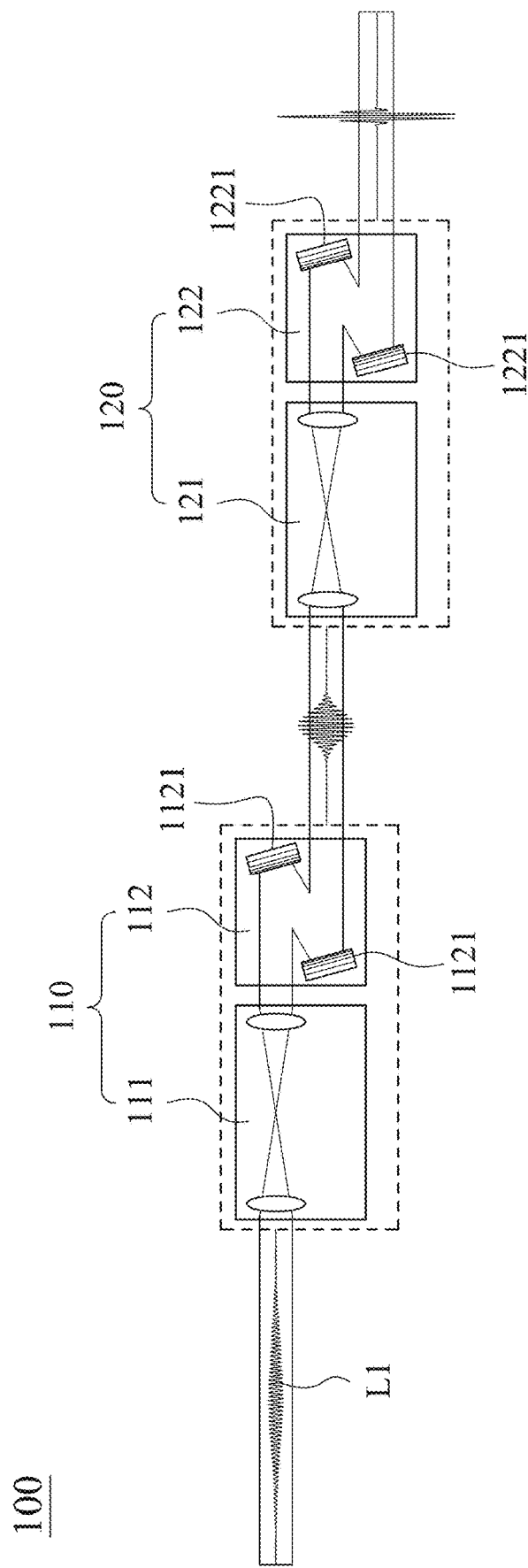
FIG. 1A shows a schematic view of a cascaded focusing and compressing postcompression system according to a 1st embodiment of the present disclosure.

FIG. 1A shows a schematic view of a cascaded focusing and compressing postcompression system 100 according to the 1st embodiment of the present disclosure. In FIG. 1A, light pulses passes through the cascaded focusing and compressing postcompression system 100, and the cascaded focusing and compressing postcompression system 100 includes at least one CASCADE module. A number of the at least one CASCADE module is two, and the two CASCADE modules are a first CASCADE module 110 and a second CASCADE module 120. The first CASCADE module 110 includes a first focusing unit 111 and a first compressing unit 112. The second CASCADE module 120 includes a second focusing unit 121 and a second compressing unit 122. Each of the first focusing unit 111 and the second focusing unit 121 is for nonlinearly broadening the spectral bandwidth of the light pulses. Each of the first compressing unit 112 and the second compressing unit 122 is for shortening a pulse duration of the light pulses. When the light pulses enter the first focusing unit 111, the focused light pulses induce an instantaneous refractive index change, for instance, Self-Phase Modulation (SPM) or ionization, lead to broaden the bandwidth of the light pulses, and then the first compressing unit 112 compensates for the induced dispersion, shortening the pulse duration thereof; then the aforementioned process is repeated in the second focusing unit 121 and the second compressing unit 122 of the second CASCADE module 120. Therefore, the light pulses with broader bandwidth and shorter pulse duration can be produced.

In detail, SPM can be described as the following formula (1):

$$n = n_0 + n_2 \cdot I \quad (1).$$

Wherein n is refraction index, $n_0$ is the initial refraction index of each of medium in the first focusing unit 111 and the second focusing unit 121, $n_2$ is the nonlinear refractive index of the medium in the first focusing unit 111 and the second focusing unit 121, and I is intensity of the light pulses. Specifically, an initial energy of the light pulses can be 0.01 mJ-100 mJ, and an initial wavelength of the light pulses can be between 200 nm-10000 nm. In the 1st embodiment, the initial energy of the light pulses is 1.33 mJ. The initial wavelength of the light pulses is 1030 nm. Specifically, each of the first focusing unit 111 and the second focusing unit 121 can include a medium, and the medium is filled with a gas, a liquid, or a solid material. While the light pulses enter the first focusing unit 111 and the second focusing unit 121, the accumulation of nonlinear phase shift results in the spectral broadening of the light pulses. Moreover, the first compressing unit 112 and the second compressing unit 122 can include at least one chirped mirror 1121, 1221, respectively. In the 1st embodiment, the number of the chirped mirrors 1121, 1221 in the first compressing unit 112 and the second compressing unit 122 are both two. In detail, the first compressing unit 112 and the second compressing unit 122 can include any element which can shorten the pulse duration of the light pulses, and the present disclosure should not be limited thereto. Before losing the coherence due to intense self-focusing effect, the light pulses leave the first focusing unit 111 is reflected and compressed by the chirped mirror 1121 and then is reflected and compressed by the chirped mirror 1221 in the second focusing unit 121. Hence, the intense light pulses can be broadened spectrally, while keeping the spatial and temporal coherence.

As shown in FIG. 1A, each of the chirped mirrors 1121, 1221 of the first compressing unit 112 and the second compressing unit 122 are disposed parallel for folding a light path of the light pulses in direction of zigzag. Hence, a space usage of the cascaded focusing and compressing postcompression system 100 can be reduced.

Moreover, each of the medium of the first focusing unit 111 and the second focusing unit 121 is filled with the gas. Hence, the nonlinear broadening of the light pulses can be adjusted by the gas pressure.

In the 1st embodiment, the gas is argon, and a pressure of each of the first focusing unit 111 and the second focusing unit 121 can be 10 torr-7600 torr. Via tuning the pressure of the first focusing unit 111 and the second focusing unit 121, it is favorable for controlling the broadened bandwidth of the light pulses.

Figure 1B:
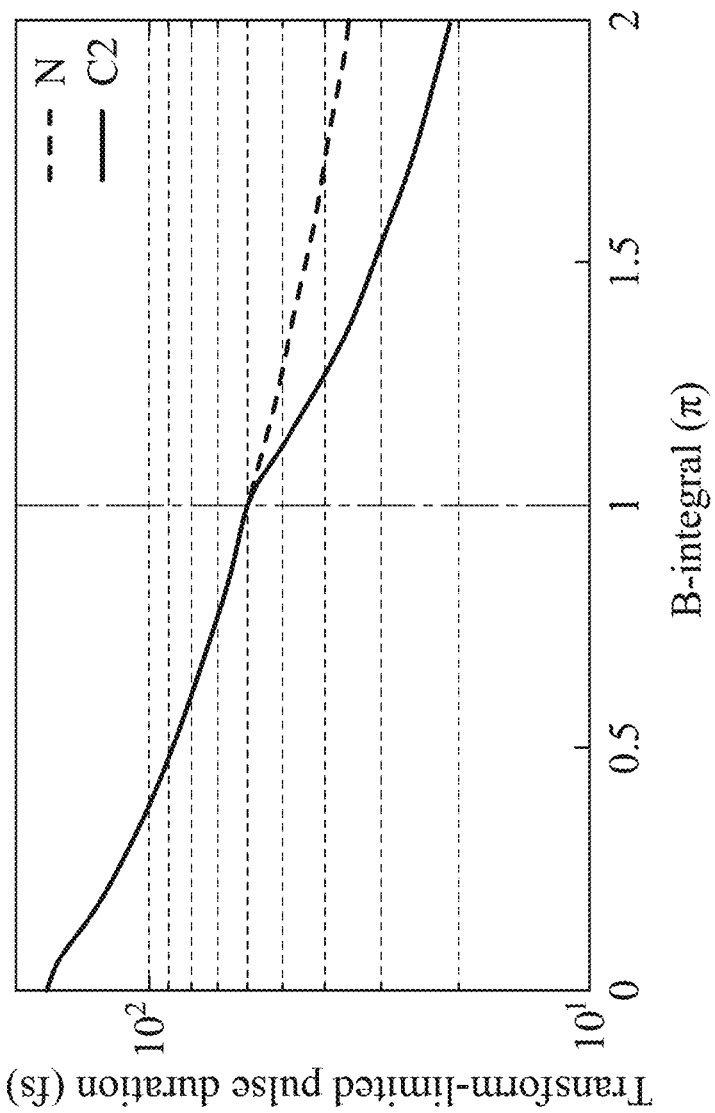
FIG. 1B shows a calculation diagram of the on-axis B-integral of the light pulses in the cascaded focusing and compressing postcompression system in FIG. 1A according to the 1st embodiment and the conventional art.

FIG. 1B shows a calculated diagram of the on-axis B-integral of the light pulses in the cascaded focusing and compressing postcompression system 100 in FIG. 1A according to the 1st embodiment and the conventional art. As shown in FIG. 1B, the line C2 represents a relation between transform-limited pulse duration and the accumulated B-integral of the light pulses in the cascaded focusing and compressing postcompression system 100. In contrast, the line N represents a relation between the transform-limited pulse duration and the B-integral of the light pulses in the conventional art without disposing any compressing unit. When the intense light pulses propagate in the medium in the first focusing unit 111 and the second focusing unit 121, inducing an instantaneous refraction index change and the non-linear phase shift $\Delta\varphi_{NL}(t)$, called B-integral and is described as the following formula (2):

$$\Delta\varphi_{NL}(t) = -\omega_0/c n_2 \int_0^L I(t,z)dz = -w_0/c n_2 I(t)L \quad (2)$$

Wherein $\omega_0$ is angular frequency of the light pulses, c is light speed, $n_2$ is the nonlinear refractive index of the medium in the first focusing unit 111 and the second focusing unit 121, I(t, z) is a space-time distribution of the light pulses and L is a propagation distance of the light pulses in the first CASCADE module 110 and the second CASCADE module 120. The formula (2) estimates the B-integral, in which we assume the time distribution of the light pulses remains constant in the first CASCADE module 110 and the second CASCADE module 120. Consequently, the instantaneous frequency of the light pulses can be written in the following formula (3):

$$\omega_{inst}(t) = -\frac{d}{dt}(\omega_0 t + \Delta\varphi_{NL}(t)) = \omega_0 + \Delta\omega(t) = \omega_0 - \frac{\omega_0}{c}n_2 L\frac{dI(t)}{dt}. \quad (3)$$

Wherein the frequency shift $\Delta\omega(t)$ of the light pulses is proportional to the slope of the time distribution of the light pulses $$\frac{dI(t)}{dt}.$$

Therefore, the shorter light pulses can obtain a more frequency shift. In the 1st embodiment, the light pulses in the cascaded focusing and compressing postcompression system 100 are broadened and compressed two times. As shown in FIG. 1B, an initial pulse durations of the light pulse is 170 fs. After nonlinear propagation, accumulating B-integral as high as 2 $\pi$, the pulse duration of the cascaded broadening and compressing laser system 100 is 20 fs. Compared to the other configuration, without any compression units between two focusing units, the pulse duration is 37 fs after accumulating B-integral as high as 2 $\pi$. Hence, the light pulses of the present disclosure can be broadened more efficiently.

Figure 2A:
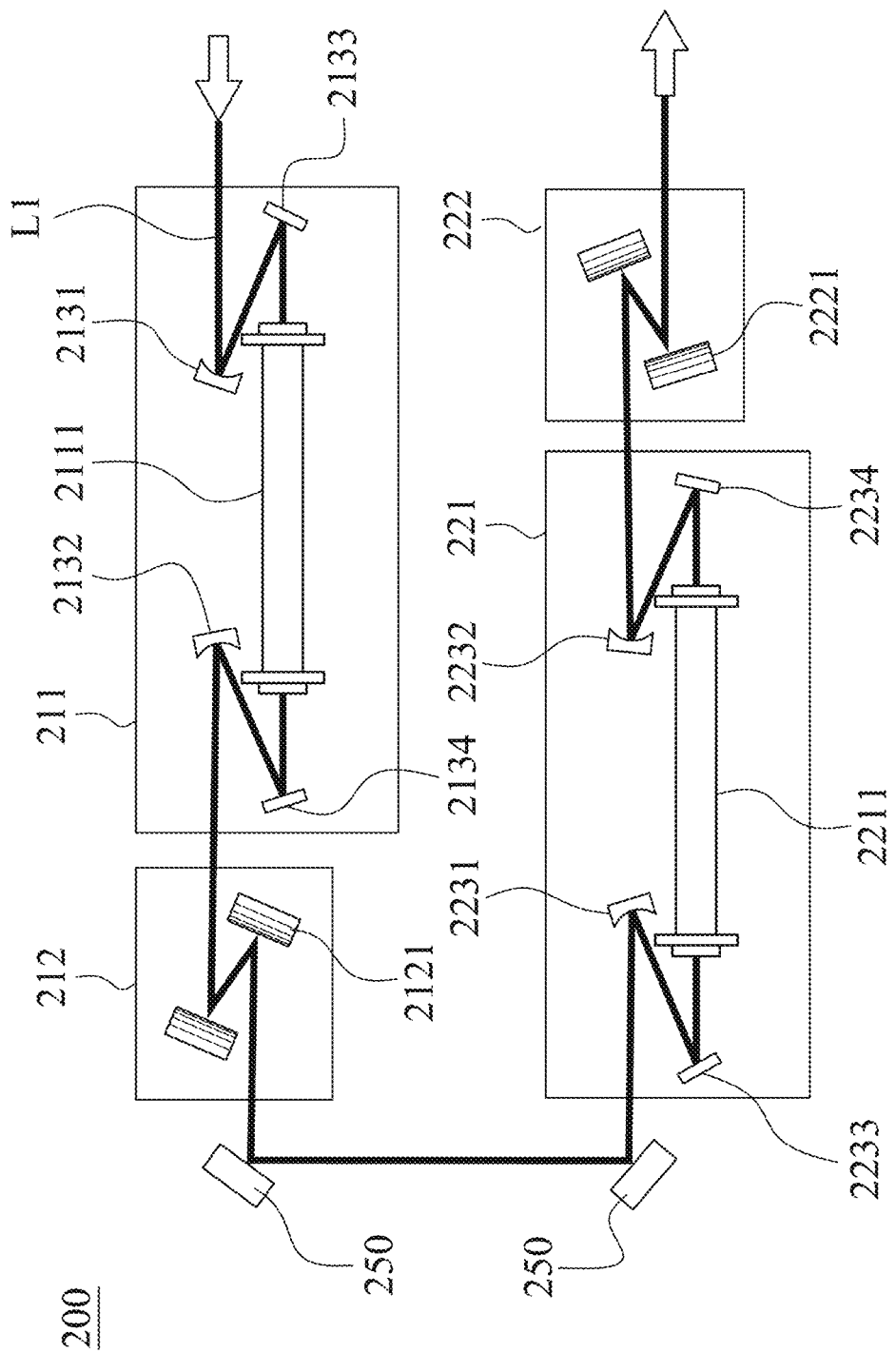
FIG. 2A shows a schematic view of a cascaded focusing and compressing postcompression system according to a 2nd embodiment of the present disclosure.

FIG. 2A shows a schematic view of a cascaded focusing and compressing postcompression system 200 according to a 2nd embodiment of the present disclosure. In FIG. 2A, light pulses passes through the cascaded focusing and compressing postcompression system 200, and the cascaded focusing and compressing postcompression system 200 includes at least one CASCADE (cascaded focusing and compressing) module. A number of the at least one CASCADE module is two, and the two CASCADE modules are a first CASCADE module (its numeral reference is omitted) and a second CASCADE module (its numeral reference is omitted). The first CASCADE module includes a first focusing unit 211 and a first compressing unit 212. The second CASCADE module includes a second focusing unit 221 and a second compressing unit 222. Each of the first focusing unit 211 and the second focusing unit 221 is for nonlinear broadening a bandwidth of the light pulses. Each of the first compressing unit 212 and the second compressing unit 222 is for shortening a pulse duration of the light pulses.

In the 2nd embodiment, the first focusing unit 211 and the second focusing unit 221 can include media 2111, 2211, respectively, and the media 2111, 2211 are filled with a gas, a liquid, or a solid. The first compressing unit 212 and the second compressing unit 222 can include two chirped mirrors 2121, 2221, respectively, but the present disclosure is not limited to the number of the chirped mirrors. Each two of the chirped mirrors 2121, 2221 are disposed parallel for folding a light path L1 of the light pulses in direction of zigzag. Specifically, the cascaded focusing and compressing postcompression system 200 can further include focusing elements 2131, 2132, 2231, 2232 and reflecting elements 2133, 2134, 250, 2233, 2234. The focusing elements 2131, 2132, 2231, 2232 are for focusing the light pulses, and the reflecting elements 2133, 2134, 250, 2233, 2234 are for folding the light path L1 of the light pulses. Hence, the bandwidth of the light pulses can be further broadened via the focusing elements, and the light path of the light pulses can be further folded via the reflecting elements.

Moreover, the first CASCADE module and the second CASCADE module can be arranged side by side along a direction parallel to an emission direction of the light pulses, and the focusing elements 2131, 2132, 2231, 2232 and the reflecting elements 2133, 2134, 250, 2233, 2234 are for folding the light path L1 of the light pulses in direction of zigzag. Specifically, in the first focusing unit 211, the light path L1 of the light pulses in order passes through the focusing element 2131, the reflecting element 2133, the medium 2111, the reflecting element 2134 and the focusing element 2132. The focusing elements 2131, 2132 are concave mirrors which of the focal lengths are 2 m and 4 m, respectively. The reflecting elements 250 are disposed between the first compressing unit 212 and the second focusing unit 221. In the second focusing unit 221, the light path L1 of the light pulses in order passes through the focusing element 2231, the reflecting element 2133, the medium 2211, the reflecting element 2234 and the focusing element 2232. The focusing elements 2231, 2232 are concave mirrors which of the focal lengths are 3 m. Hence, a space usage of the cascaded focusing and compressing postcompression system 200 can be reduced.

Figure 2B:
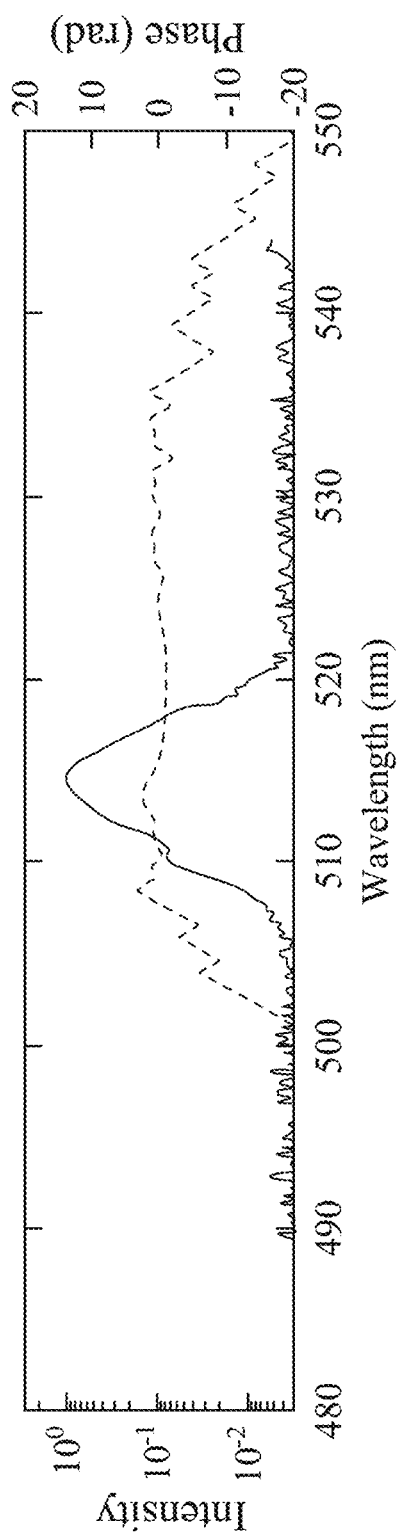
FIG. 2B shows a measurement diagram of a relation between intensity and wavelength and a phase diagram of the light pulses before entering the cascaded focusing and compressing postcompression system 200.
Figure 2C:
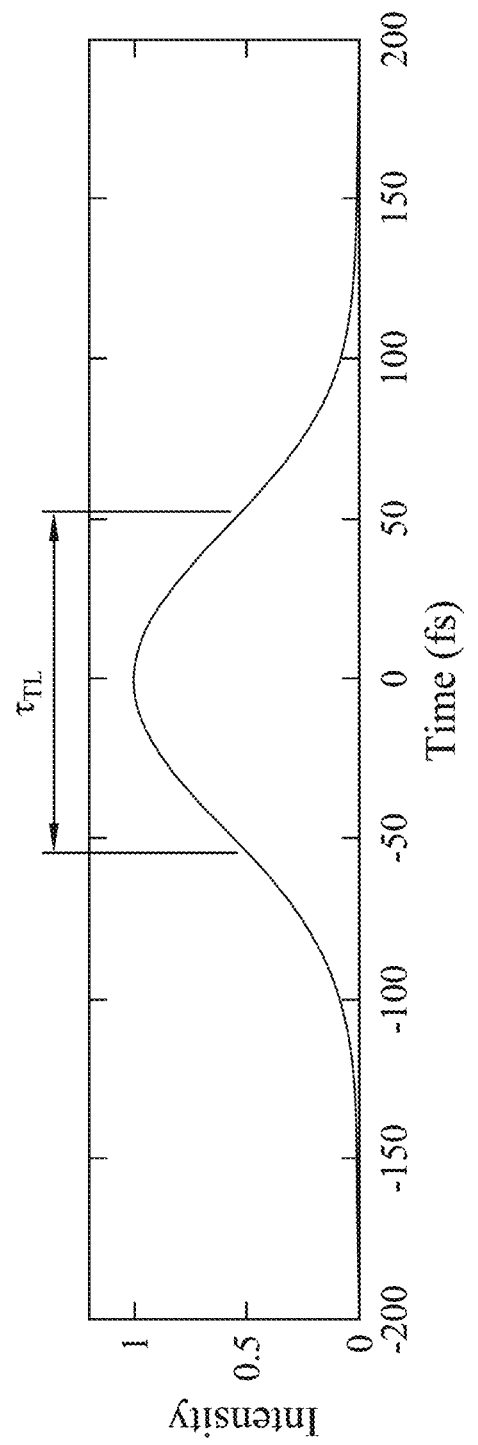
FIG. 2C shows a diagram of the transformed-limited pulse duration of the light pulses before entering the cascaded focusing and compressing postcompression system in FIG. 2A according to the 2nd embodiment.
Figure 2D:
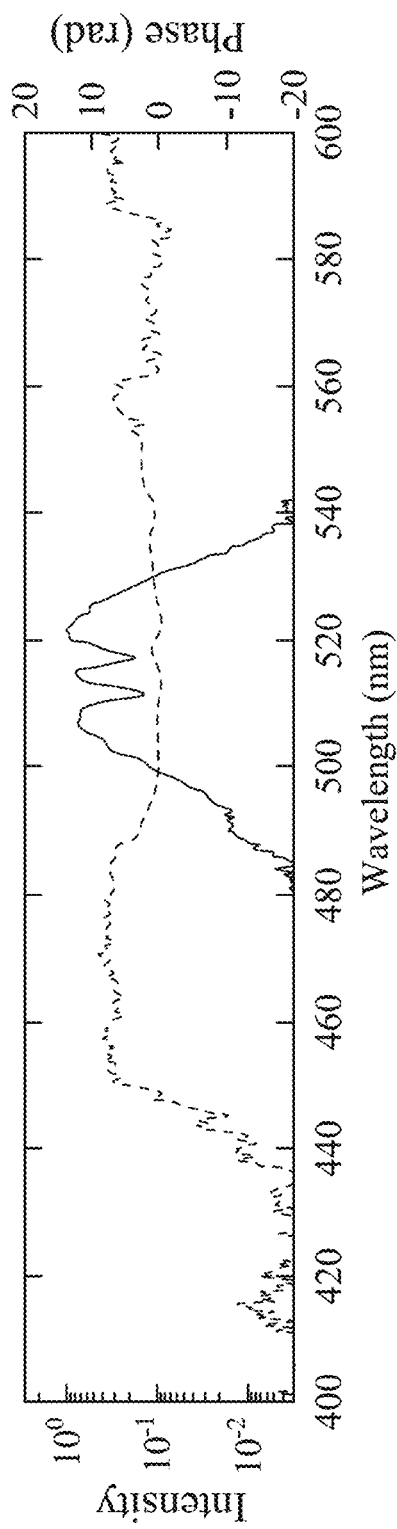
FIG. 2D shows a measurement diagram of a relation between intensity and wavelength and a phase diagram of the light pulses after entering the first CASCADE module in FIG. 2A according to the 2nd embodiment.
Figure 2E:
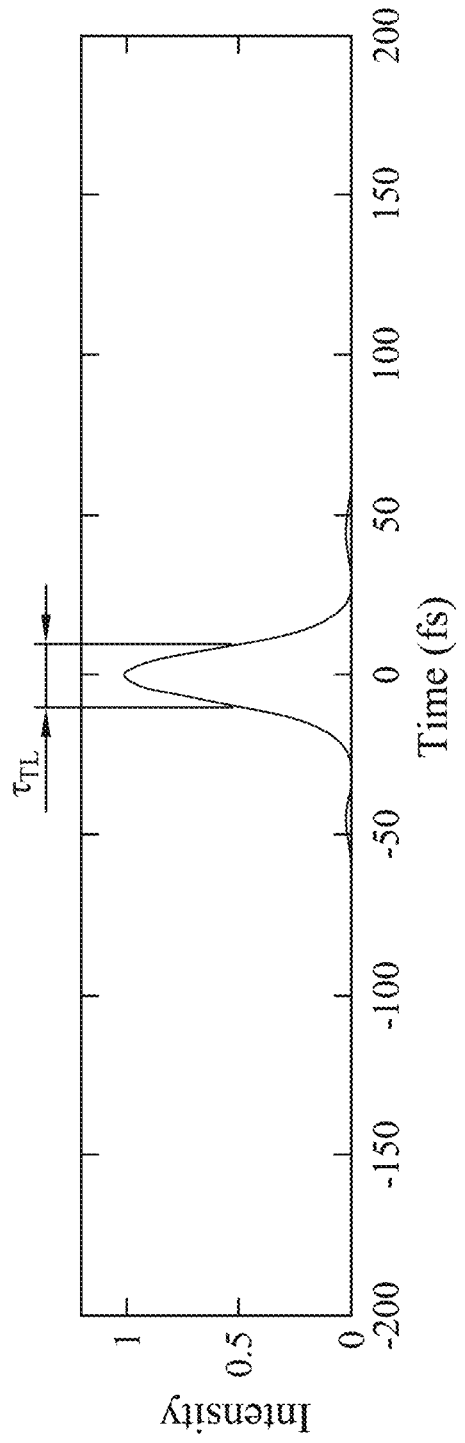
FIG. 2E shows a diagram of the transformed-limited pulse duration of the light pulses after entering the first CASCADE module in FIG. 2A according to the 2nd embodiment.
Figure 2F:
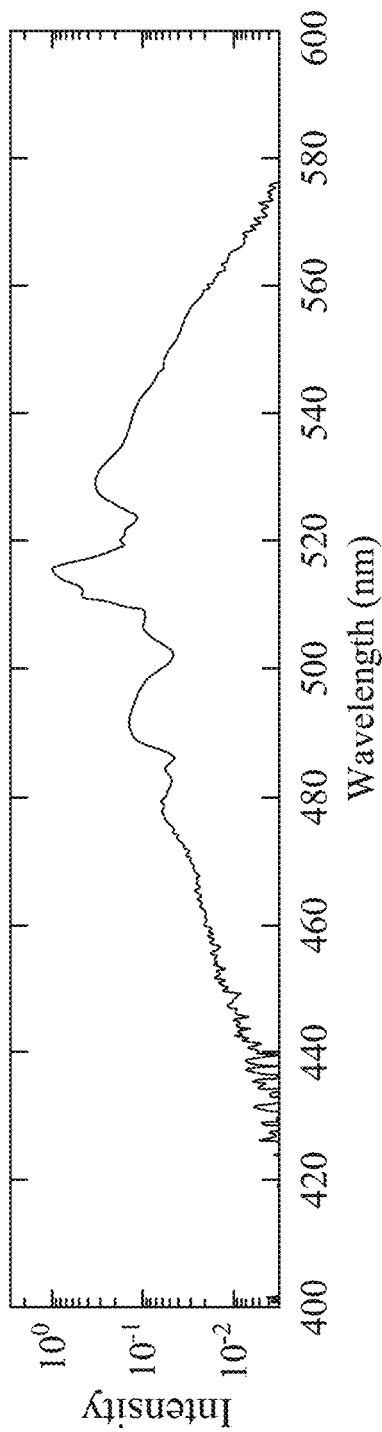
FIG. 2F shows a measurement diagram of a relation between intensity and wavelength and a phase diagram of the light pulses after entering the second CASCADE module in FIG. 2A according to the 2nd embodiment.
Figure 2G:
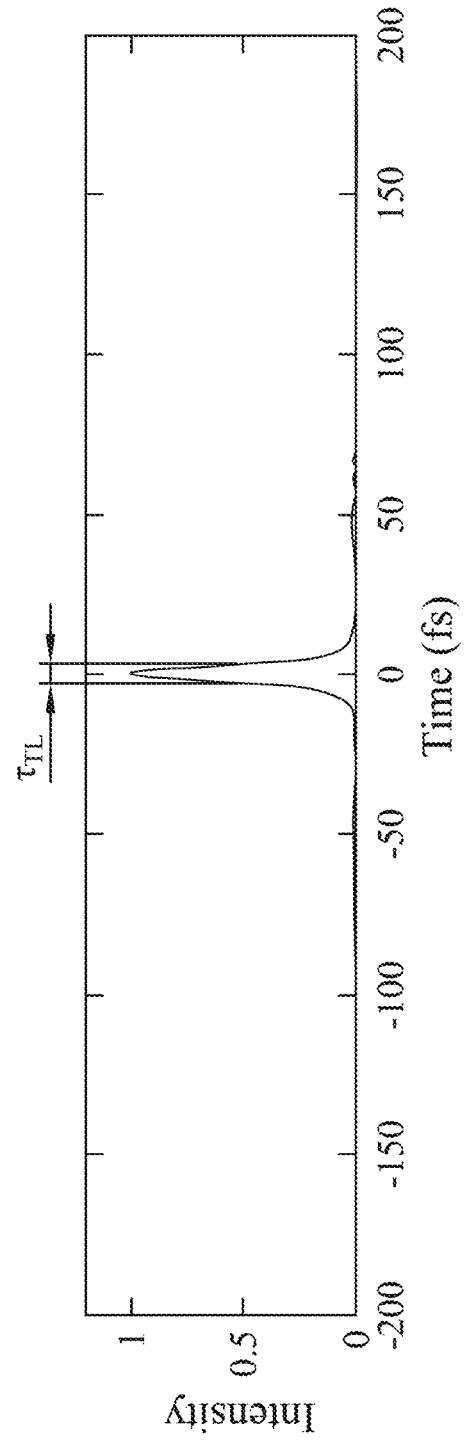
FIG. 2G shows a diagram of the transformed-limited pulse duration of the light pulses after entering the second CASCADE module in FIG. 2A according to the 2nd embodiment.

FIG. 2B shows a measurement diagram of a relation between intensity and wavelength and a phase diagram of the light pulses before entering the cascaded focusing and compressing postcompression system 200 in FIG. 2A according to the 2nd embodiment. FIG. 2C shows a diagram of the transformed-limited pulse duration TTL of the light pulses before entering the cascaded focusing and compressing postcompression system 200 in FIG. 2A according to the 2nd embodiment. FIG. 2D shows a measurement diagram of a relation between intensity and wavelength and a phase diagram of the light pulses after entering the first CASCADE module in FIG. 2A according to the 2nd embodiment. FIG. 2E shows a diagram of the transformed-limited pulse duration $\tau_{TL}$ of the light pulses after entering the first CASCADE module in FIG. 2A according to the 2nd embodiment. FIG. 2F shows a measurement diagram of a relation between intensity and wavelength of the light pulses after entering the second CASCADE module in FIG. 2A according to the 2nd embodiment. FIG. 2G shows a diagram of the transformed-limited pulse duration $\tau_{TL}$ of the light pulses after entering the second CASCADE module in FIG. 2A according to the 2nd embodiment. In the 2nd embodiment, the media 2111, 2211 are filled with the gas, and the gas is noble gas. Specifically, the gas can be argon. In the 2nd embodiment, an initial energy of the light pulses is 0.6 mJ and an initial wavelength of the light pulses is 515 nm. Specifically, pressures of the media 2111, 2211 can be 200 torr or 400 torr, but the present disclosure is not limited thereto. After transmitting through the CASCADED modules, the bandwidth of the light pulses in the condition of the media 2111, 2211 with 200 torr or 400 torr can be broadened widely. As shown in FIGS. 2C, 2E and 2G, full width at half maxima (FWHM) of the light pulses can be used to define transform-limited pulse durations $\tau_{TL}$. The transform-limited pulse durations $\tau_{TL}$ from the beginning to the first CASCADE module and the second CASCADE module are 147 fs, 23 fs and 7 fs, respectively. As shown in FIGS. 2B, 2D and 2F, the dash lines represent the relation between phase and wavelength of the light pulses. While the bandwidth of the light pulses is broadened in the large range, the coherence of the light pulses remains in very high degree. Hence, a coherent supercontinuum can be provided. The solid lines represent the relation between intensity and wavelength of the light pulses. In detail, the bandwidth of the light pulses can be broadened gradually from the range of 510 nm-520 nm to the range of 460 nm-560 nm.

Figure 2H:
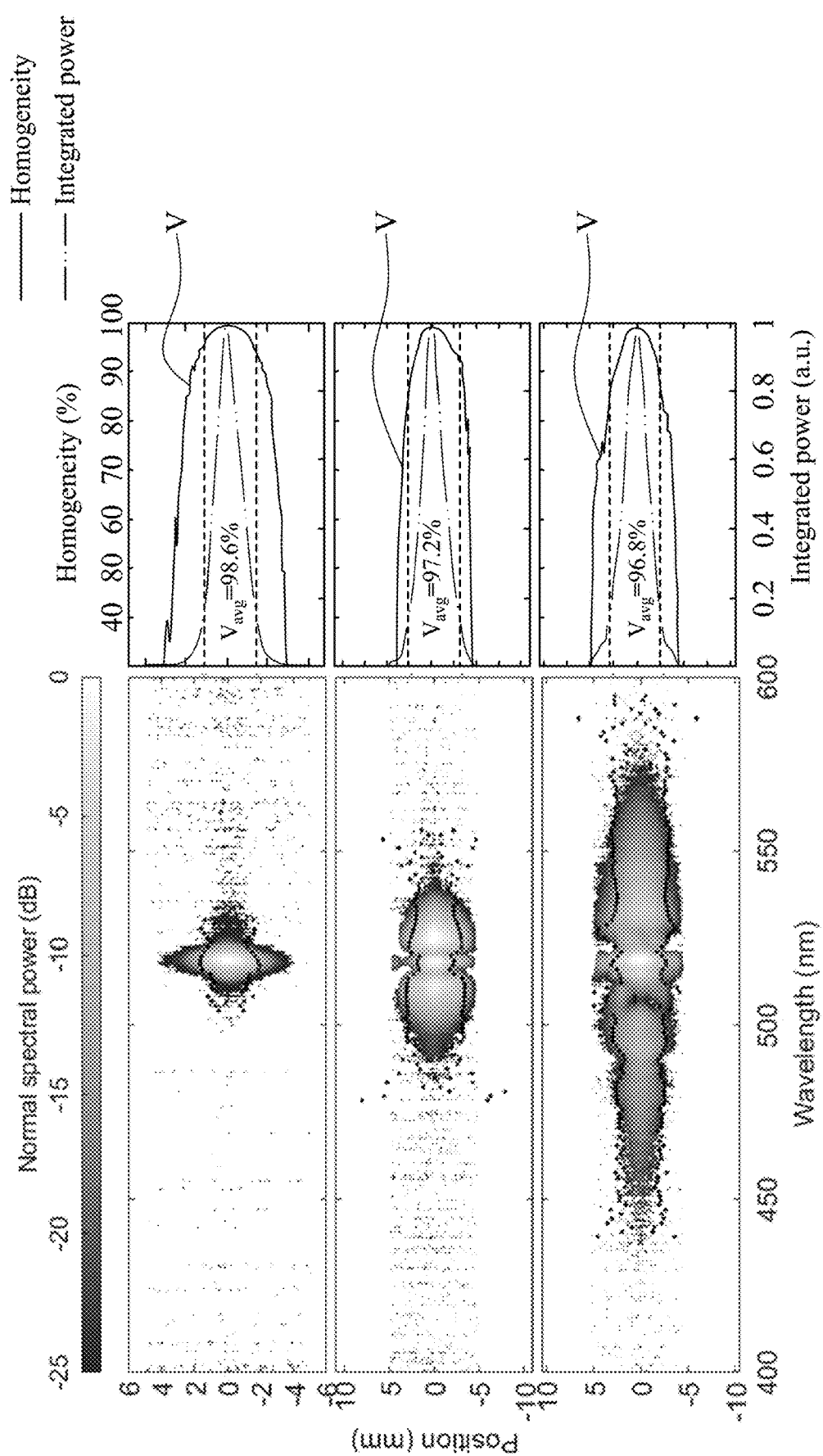
FIG. 2H shows a measurement diagram of the spatial spectrum and homogeneity of the light pulses in the cascaded focusing and compressing postcompression system in FIG. 2A according to the 2nd embodiment.

FIG. 2H shows a measurement diagram of the spatial spectrum and homogeneity of the light pulses in the cascaded focusing and compressing postcompression system 200 in FIG. 2A according to the 2nd embodiment. As shown in FIG. 2H, the blocks from the top to the bottom represent the spatial spectrum along the transverse direction and the homogeneity of the light pulses from the beginning to the first CASCADE module and the second CASCADE module, respectively. The spatial spectrums along the transverse direction illustrate that the light pulses in the cascaded focusing and compressing postcompression system 200 remains in a good homogeneous in space. In the 2nd embodiment, the homogeneity values V can be calculated to obtain the average homogeneity values $V_{avg}$. The average homogeneity values $V_{avg}$ remain almost the same and the average homogeneity values $V_{avg}$ are larger than 96% within the one over exponential square of the intensity profile, but the present disclosure is not limited thereto. Hence, high spectral homogeneity can be achieved.

Figure 3A:
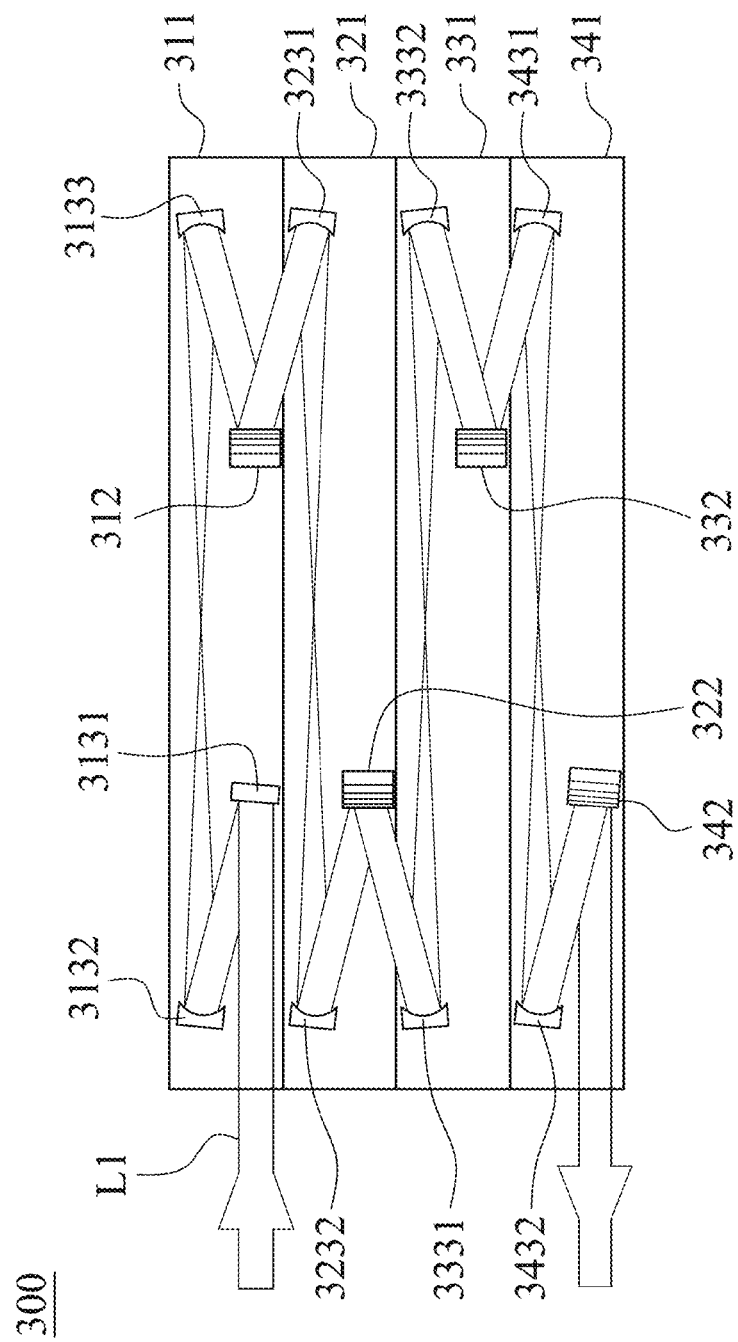
FIG. 3A shows a schematic view of a cascaded focusing and compressing postcompression system according to the 3rd embodiment of the present disclosure.

FIG. 3A shows a schematic view of a cascaded focusing and compressing postcompression system 300 according to a 3rd embodiment of the present disclosure. In FIG. 3A, light pulses pass through the cascaded focusing and compressing postcompression system 300 includes at least one CASCADE (cascaded focusing and compressing) module. A number of the at least one CASCADE module is four, and the four CASCADE modules are a first CASCADE module (its numeral reference is omitted), a second CASCADE module (its numeral reference is omitted), a third CASCADE module (its numeral reference is omitted) and a fourth CASCADE module (its numeral reference is omitted). The first CASCADE module includes a first focusing unit 311 and a first compressing unit 312. The second CASCADE module includes a second focusing unit 321 and a second compressing unit 322. The third CASCADE module includes a third focusing unit 331 and a third compressing unit 332. The fourth CASCADE module includes a fourth focusing unit 341 and a fourth compressing unit 342. Each of the first focusing unit 311, the second focusing unit 321, the third focusing unit 331 and the fourth focusing unit 341 is for nonlinear broadening a bandwidth of the light pulses. Each of the first compressing unit 312, the second compressing unit 322, the third compressing unit 332 and the fourth compressing unit 342 is for shortening a pulse duration of the light pulses.

Specifically, the cascaded focusing and compressing postcompression system 300 can further include first focusing elements 3132, 3133, second focusing elements 3231, 3232, third focusing elements 3331, 3332, fourth focusing elements 3431, 3432 and a reflecting element 3131. In the 3rd embodiment, each of the first focusing unit 311, the second focusing unit 321, the third focusing unit 331 and the fourth focusing unit 341 can include a medium, and the medium is filled with gas. Each of the first compressing unit 312, the second compressing unit 322, the third compressing unit 332 and the fourth compressing unit 342 is a chirped mirror and disposed in each of the first focusing unit 311, the second focusing unit 321, the third focusing unit 331 and the fourth focusing unit 341, respectively. Moreover, the first focusing unit 311, the second focusing unit 321, the third focusing unit 331 and the fourth focusing unit 341 are arranged side by side along a direction parallel to an emission direction of the light pulses, and the reflecting element 3131, the first focusing elements 3132, 3133, the second focusing elements 3231, 3232, the third focusing elements 3331, 3332 and the fourth focusing elements 3431, 3432 are for folding the light path L1 of the light pulses in direction of zigzag. Specifically, the reflecting element 3131 and the first focusing elements 3132, 3133 are disposed in the first focusing unit 311, the second focusing elements 3231, 3232 are disposed in the second focusing unit 321, the third focusing elements 3331, 3332 are disposed in the third focusing unit 331, and the fourth focusing elements 3431, 3432 are disposed in the fourth focusing unit 341. The first focusing elements 3132, 3133, the second focusing elements 3231, 3232, the third focusing elements 3331, 3332 and the fourth focusing elements 3431, 3432 are concave mirrors, and the reflecting element 3131 is a flat mirror. In detail, the light pulses in order passes through the reflecting element 3131, the first focusing elements 3132, 3133, the first compressing unit 312, the second focusing elements 3231, 3232, the second compressing unit 322, the third focusing elements 3331, 3332, the third compressing unit 332, the fourth focusing elements 3341, 3342 and then the fourth compressing unit 342. Because of the zigzag configuration, a space usage of the cascaded focusing and compressing postcompression system 300 can be reduced.

In detail, an initial energy of the light pulses is 1.34 mJ, an initial wavelength thereof is 1030 nm and the pulse duration thereof is 157 fs, but the present disclosure is not limited thereto. After the light pulses passes through the first CASCADE module, the energy of the light pulses becomes 1.31 mJ, the pulse duration thereof is compressed into 78.3 fs; then, when the light pulses passes through the second CASCADE module, the energy of the light pulses becomes 1.29 mJ, the pulse duration thereof is compressed into 22.6 fs; when the light pulses passes through the third CASCADE module, the energy of the light pulses becomes 1.16 mJ, the pulse duration thereof is compressed into 7.2 fs; finally, when the light pulses passes through the fourth CASCADE module, the energy of the light pulses becomes 0.98 mJ, the pulse duration thereof is compressed into 3.1 fs. Via the configuration of the CASCADE module, the overall conversion efficiency of the light pulses from 157 fs to 3.1 fs can be highly efficient such as 77%.

Specifically, the medium can be filled with argon, and pressures of the first focusing unit 311, the second focusing unit 321, the third focusing unit 331 and the fourth focusing unit 341 can be 10 torr-7600 torr. In the 3rd embodiment, the pressures of the first focusing unit 311, the second focusing unit 321, the third focusing unit 331 and the fourth focusing unit 341 are 760 torr, 760 torr, 210 torr and 150 torr, respectively. Via tuning the pressure of the focusing units, it is favorable for controlling the nonlinear broadening and dispersion of the light pulses, while keeping the coherence of the light pulses.

Figure 3B:
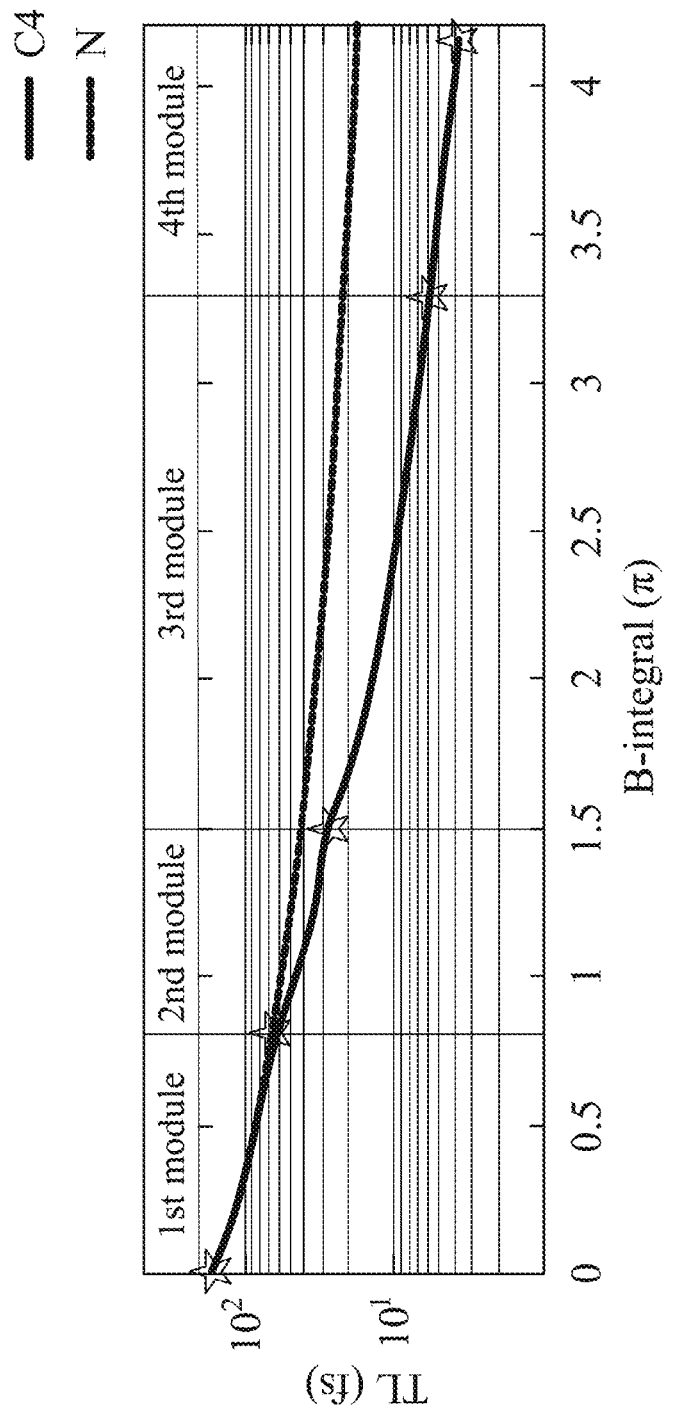
FIG. 3B shows a calculated diagram of the on-axis B-integral of the light pulses of the first CASCADE module to the fourth CASCADE module of the cascaded focusing and compressing postcompression system in FIG. 3A according to the 3rd embodiment and the conventional art.

FIG. 3B shows a calculated diagram of the on-axis B-integral of the light pulses of the first CASCADE module to the fourth CASCADE module (the 1st module, the 2nd module, the 3rd module and 4th module) of the cascaded focusing and compressing postcompression system 300 in FIG. 3A according to the 3rd embodiment, and compared to the conventional art. As shown in FIG. 3B, the line C4 represents a relation between transform-limited pulse duration and B-integral of the light pulses in the cascaded focusing and compressing postcompression system 300, and the line N represents a relation between transform-limited pulse duration and B-integral of the light pulses in the conventional art without disposing compressing unit. In the 3rd embodiment, the light pulses in the cascaded focusing and compressing postcompression system 300 is broadened and compressed four times. In detail, final the pulse duration of the light pulses in the cascaded focusing and compressing postcompression system 300 is 3.1 fs through a nonlinear propagation, accumulating a B-integral of 4 π and compared to the pulse duration of the conventional art is 25 fs through accumulating the same B-integral of 4 π. Hence, a large bandwidth spectrum can be achieved which can support few-cycle pulses.

Figure 3C:
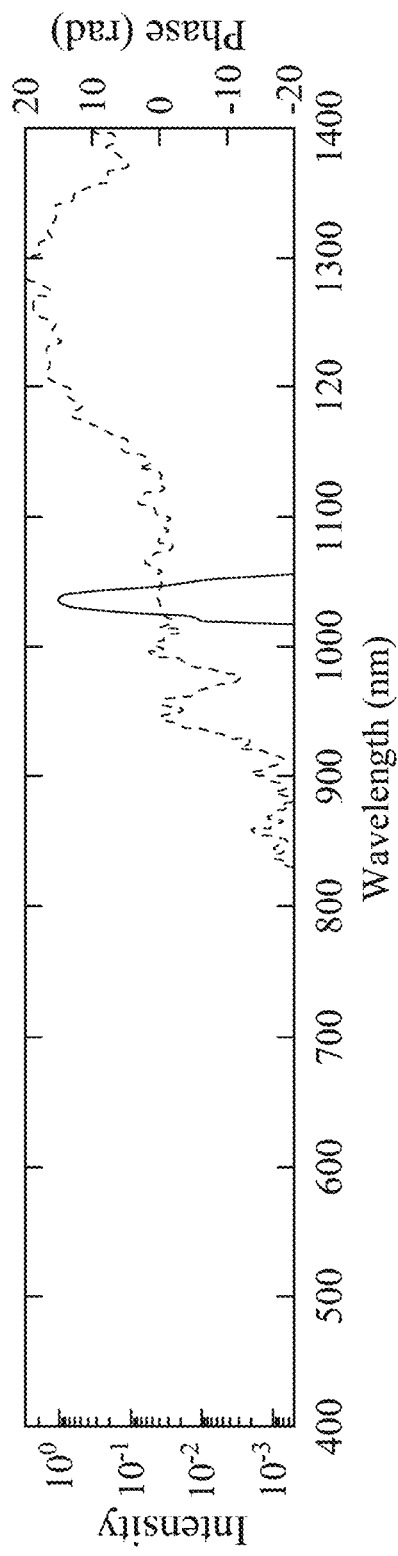
FIG. 3C shows a measurement diagram of a relation between intensity and wavelength and a phase diagram of the light pulses before entering the cascaded focusing and compressing postcompression system in FIG. 3A according to the 3rd embodiment.
Figure 3D:
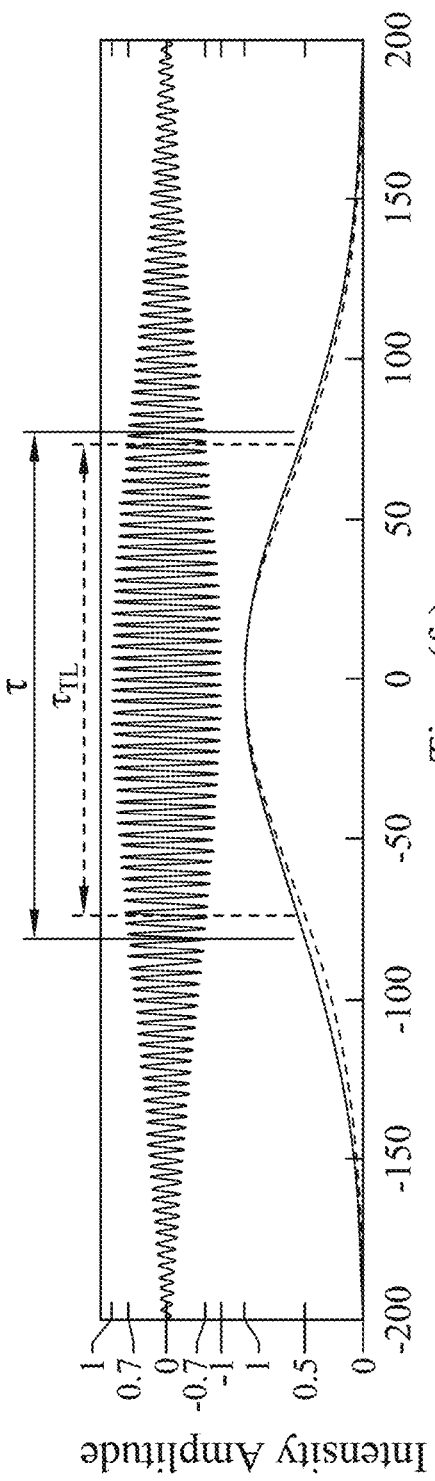
FIG. 3D shows a diagram of the measured pulse duration and the transform-limited pulse duration of the light pulses before entering the cascaded focusing and compressing postcompression system in FIG. 3A according to the 3rd embodiment.
Figure 3E:
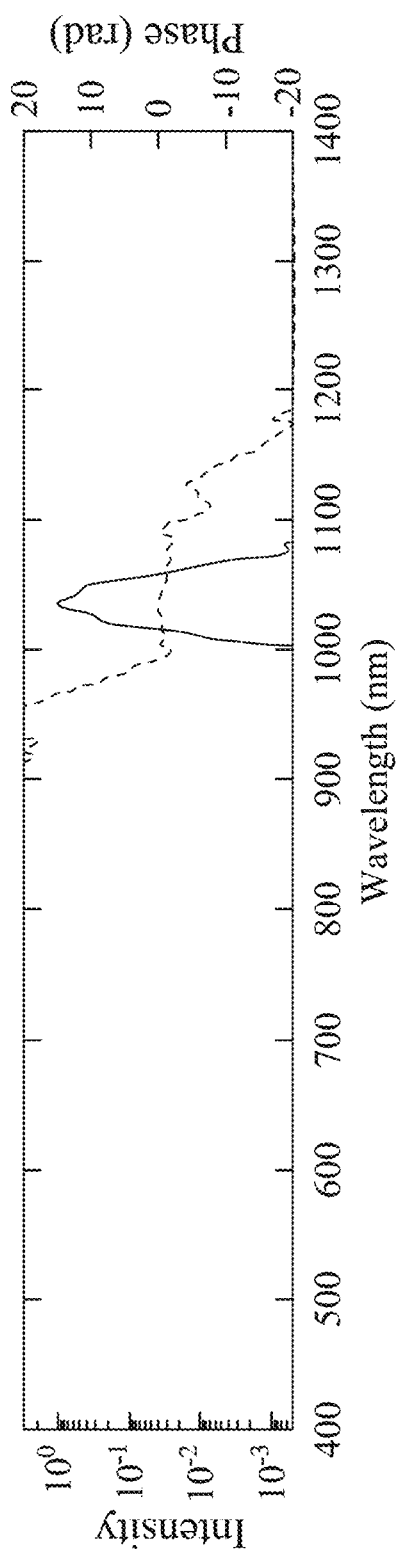
FIG. 3E shows a measurement diagram of a relation between intensity and wavelength and a phase diagram of the light pulses after entering the first CASCADE module in FIG. 3A according to the 3rd embodiment.
Figure 3F:
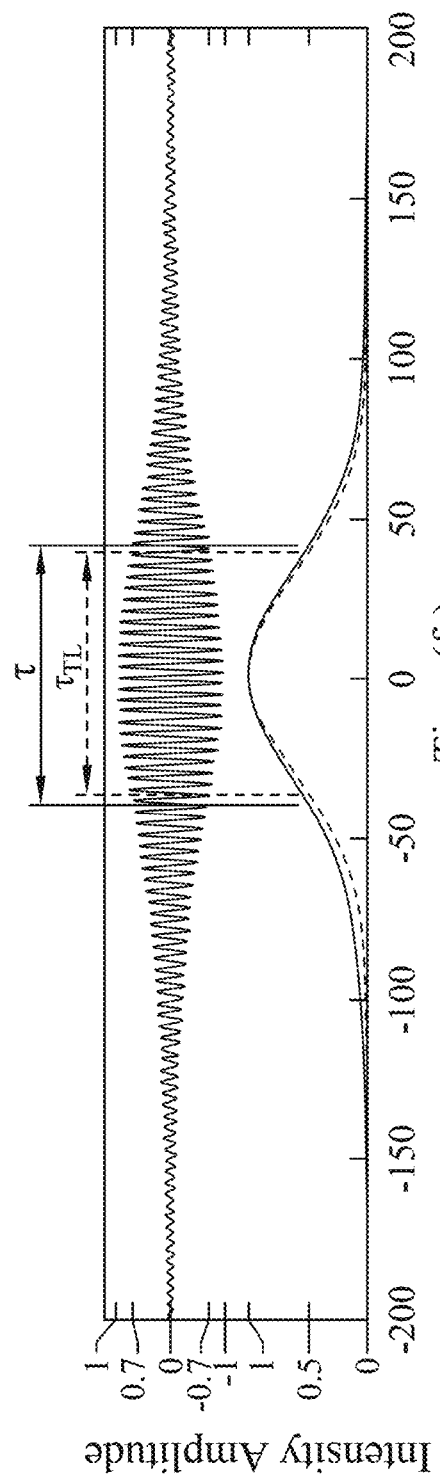
FIG. 3F shows a diagram of the measured pulse duration and the transform-limited pulse duration of the light pulses after entering the first CASCADE module in FIG. 3A according to the 3rd embodiment.
Figure 3G:
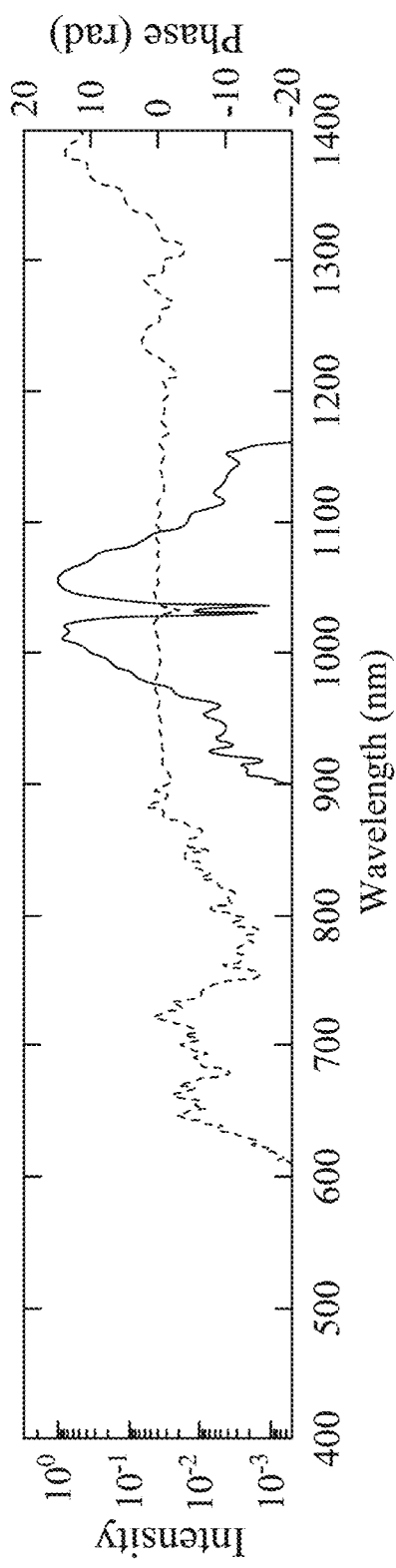
FIG. 3G shows a measurement diagram of a relation between intensity and wavelength and a phase diagram of the light pulses after entering the second CASCADE module in FIG. 3A according to the 3rd embodiment.
Figure 3H:
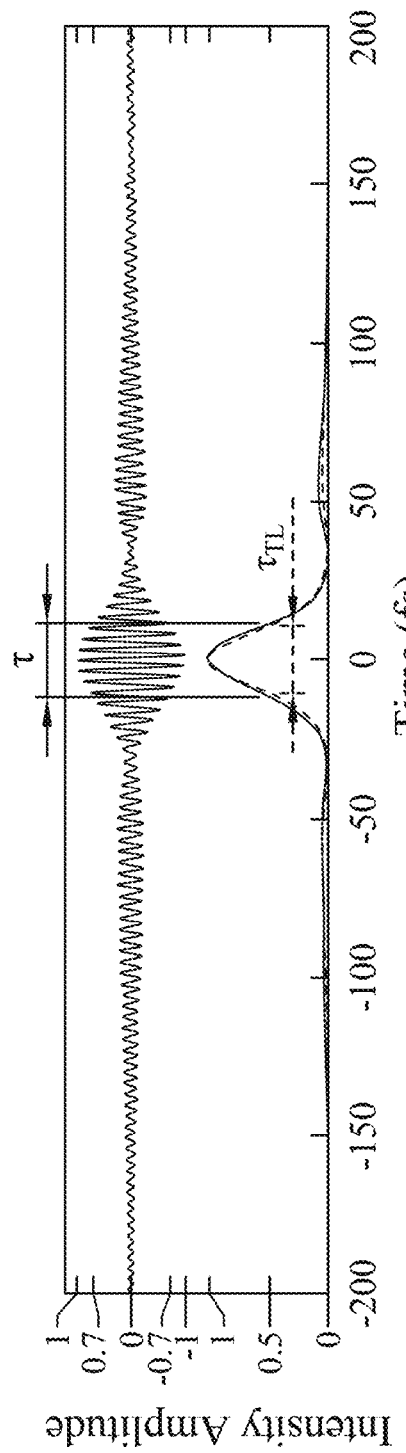
FIG. 3H shows a diagram of the measured pulse duration and the transform-limited pulse duration of the light pulses after entering the second CASCADE module in FIG. 3A according to the 3rd embodiment.
Figure 3I:
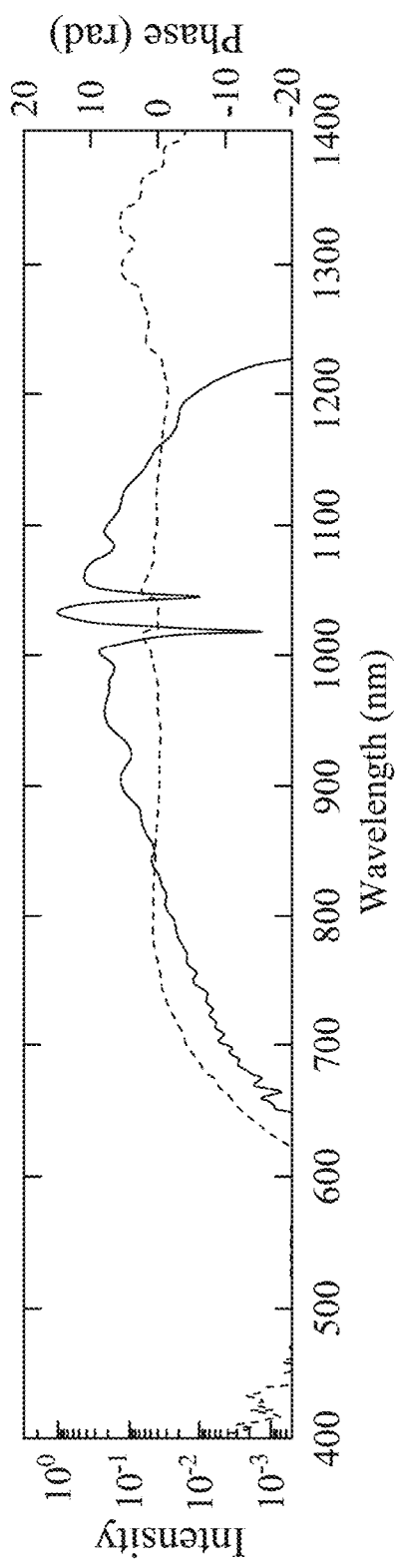
FIG. 3I shows a measurement diagram of a relation between intensity and wavelength and a phase diagram of the light pulses after entering the third CASCADE module in FIG. 3A according to the 3rd embodiment.
Figure 3J:
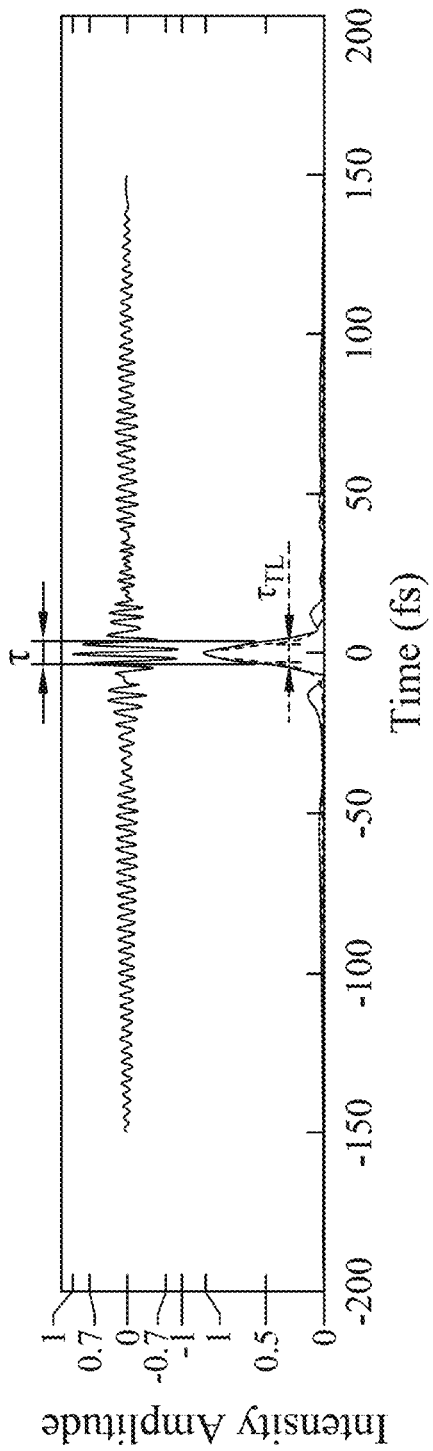
FIG. 3J shows a diagram of the measured pulse duration and the transform-limited pulse duration of the light pulses after entering the third CASCADE module in FIG. 3A according to the 3rd embodiment.
Figure 3K:
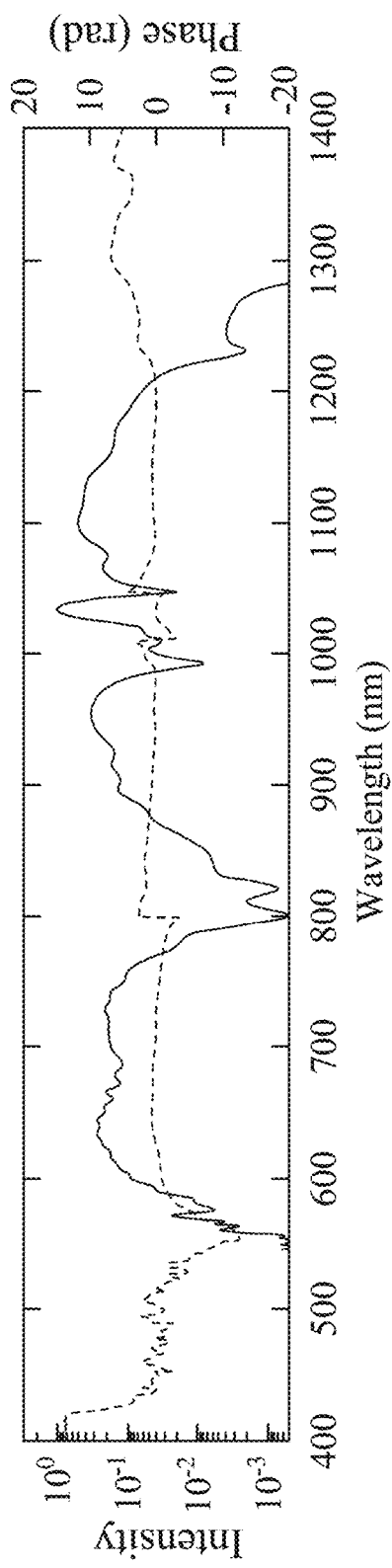
FIG. 3K shows a measurement diagram of a relation between intensity and wavelength and a phase diagram of the light pulses after entering the fourth CASCADE module in FIG. 3A according to the 3rd embodiment.
Figure 3L:
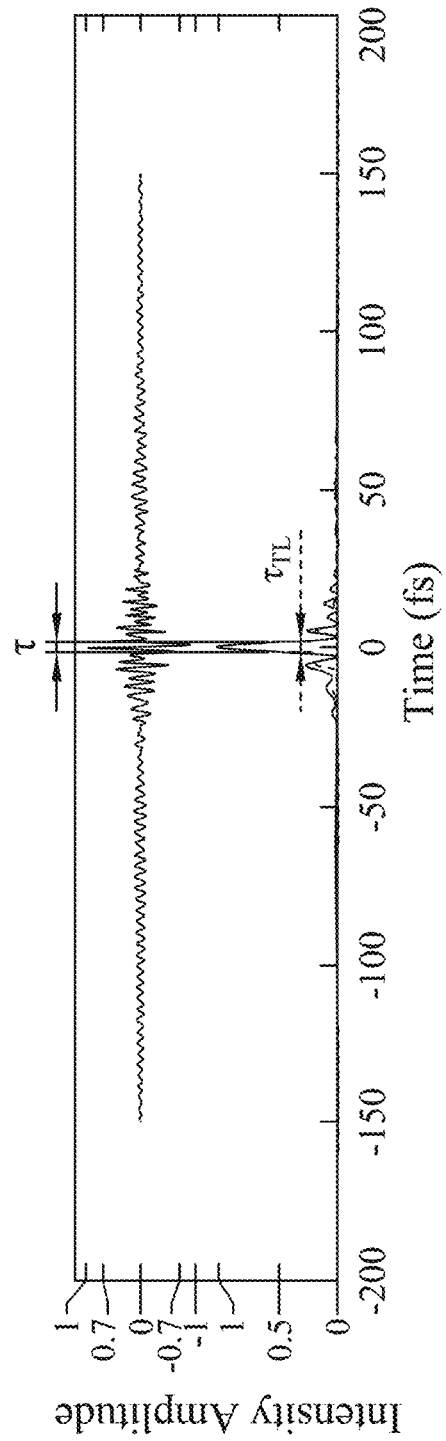
FIG. 3L shows a diagram of the measured pulse duration and the transform-limited pulse duration of the light pulses after entering the fourth CASCADE module in FIG. 3A according to the 3rd embodiment.

FIG. 3C shows a measurement diagram of a relation between intensity and wavelength and a phase diagram of the light pulses before entering the cascaded focusing and compressing postcompression system 300 in FIG. 3A according to the 3rd embodiment. FIG. 3D shows a diagram of the measured pulse duration $\tau$ and the transform-limited pulse duration $\tau_{TL}$ of the light pulses before entering the cascaded focusing and compressing postcompression system 300 in FIG. 3A according to the 3rd embodiment. FIG. 3E shows a measurement diagram of a relation between intensity and wavelength and a phase diagram of the light pulses after entering the first CASCADE module in FIG. 3A according to the 3rd embodiment. FIG. 3F shows a diagram of the measured pulse duration $\tau$ and the transform-limited pulse duration $\tau_{TL}$ of the light pulses after entering the first CASCADE module in FIG. 3A according to the 3rd embodiment. FIG. 3G shows a measurement diagram of a relation between intensity and wavelength and a phase diagram of the light pulses after entering the second CASCADE module in FIG. 3A according to the 3rd embodiment. FIG. 3H shows a diagram of the measured pulse duration $\tau$ and the transform-limited pulse duration $\tau_{TL}$ of the light pulses after entering the second CASCADE module in FIG. 3A according to the 3rd embodiment. FIG. 3I shows a measurement diagram of a relation between intensity and wavelength and a phase diagram of the light pulses after entering the third CASCADE module in FIG. 3A according to the 3rd embodiment. FIG. 3J shows a diagram of the measured pulse duration $\tau$ and the transform-limited pulse duration $\tau_{TL}$ of the light pulses after entering the third CASCADE module in FIG. 3A according to the 3rd embodiment. FIG. 3K shows a measurement diagram of a relation between intensity and wavelength and a phase diagram of the light pulses after entering the fourth CASCADE module in FIG. 3A according to the 3rd embodiment. FIG. 3L shows a diagram of the pulse duration $\tau$ and the transform-limited pulse durations $\tau_{TL}$ of the light pulses after entering the fourth CASCADE module in FIG. 3A according to the 3rd embodiment. As shown in FIGS. 3C, 3E, 3G, 3I and 3K, the solid line in FIG. 3C represent the relation between intensity and wavelength of the light pulses before entering the first focusing unit 311, the solid lines in FIGS. 3E, 3G, 3I and 3K represents the relations between intensity and wavelength of the light pulses broadened and compressed by the first focusing unit 311, the second focusing unit 321, the third focusing unit 331 and the fourth focusing unit 341, respectively. The dashed lines in FIGS. 3C, 3E, 3G, 3I and 3K represent the relation between phase and wavelength of the light pulses. Specifically, an initial wavelength of the light pulses can be 200 nm-10000 nm, but the present disclosure is not limited thereto. In the 3rd embodiment, the wavelength of the light pulses is 1030 nm. The solid lines in FIGS. 3E, 3G, 3I and 3K illustrate that the bandwidth of the light pulses is broadened gradually after each of the first focusing unit 311, the second focusing unit 321, the third focusing unit 331 and the fourth focusing unit 341. In detail, the light pulses in the cascaded focusing and compressing postcompression system 300 is broadened and compressed four times, the bandwidth of the light pulses can be broadened in a range from 550 nm to 1280 nm roughly. As shown in the phase diagram of FIG. 3K, while the bandwidth of the light pulses is broadened in a large range, the coherence of the light pulses remains in high degree, providing a high coherent supercontinuum.

Figure 3M:
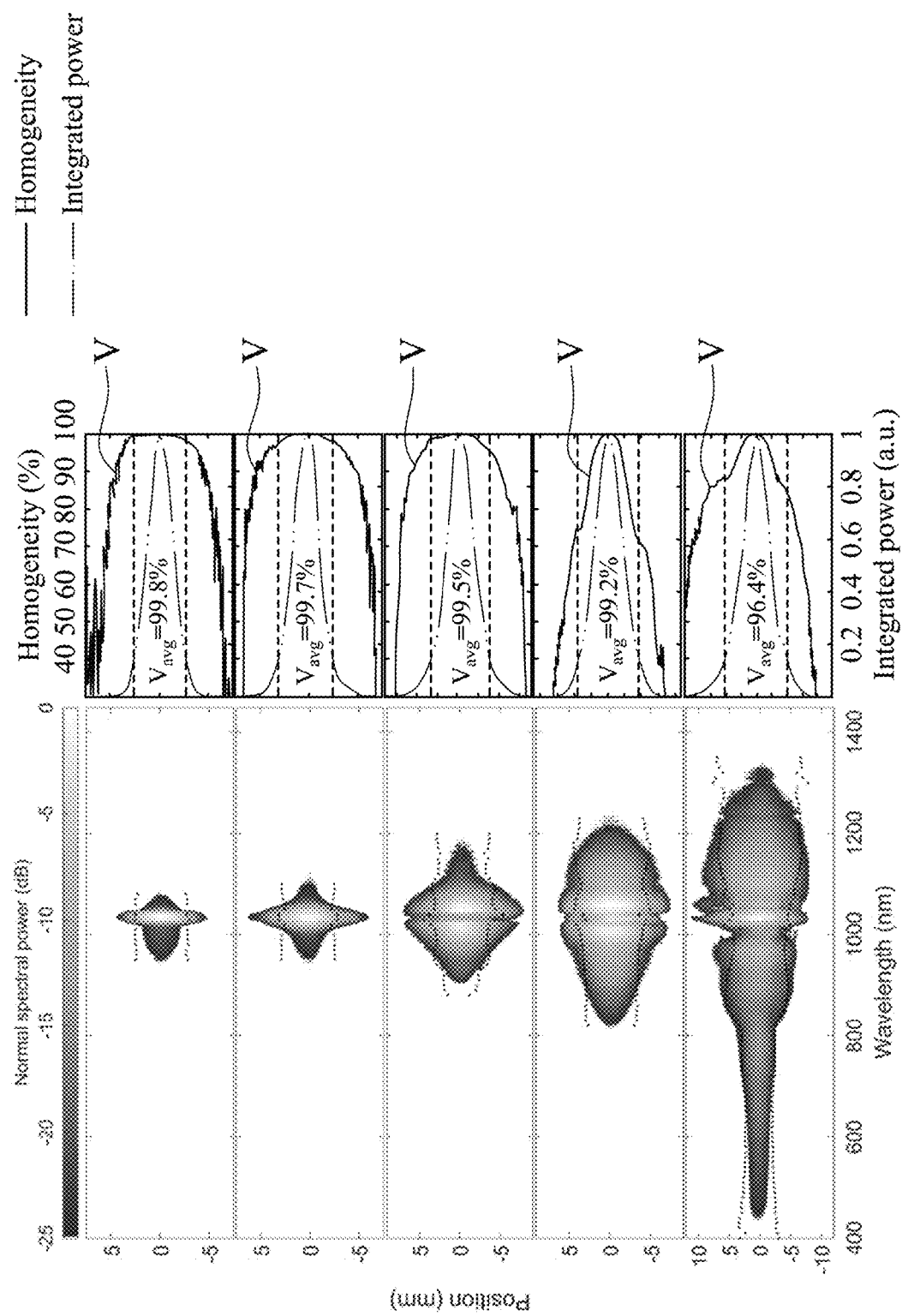
FIG. 3M shows a measurement diagram of the spatial spectrum and homogeneity of the light pulses in the cascaded focusing and compressing postcompression system in FIG. 3A according to the 3rd embodiment.

FIG. 3M shows a measurement diagram of the spatial spectrum and homogeneity of the light pulses in the cascaded focusing and compressing postcompression system 300 in FIG. 3A according to the 3rd embodiment. As shown in FIG. 3M, the blocks from the top to the bottom represent the spatial spectrum along the transverse direction and the homogeneity of the light pulses from the beginning, the first CASCADE module, the second CASCADE module, the third CASCADE module to the fourth CASCADE module, respectively. The spatial spectrums along the transverse direction illustrate that the light pulses in the cascaded focusing and compressing postcompression system 300 remains in good homogeneity in space. In the 3rd embodiment, the homogeneity values V can be calculated to obtain the average homogeneity values $V_{avg}$. The average homogeneity values $V_{avg}$ remain almost the same and are larger than 96% within the one over exponential square of the intensity profile, but the present disclosure is not limited thereto. Hence, high spatial homogeneity beam can be achieved.

As shown in FIGS. 3D, 3F, 3H, 3J and 3L, the solid lines and the dash lines on bottom in Figures present the measured pulse durations τ and the transform-limited pulse durations $τ_{TL}$, respectively. The measured pulse durations τ of the light pulses from the beginning to the first CASCADE module, the second CASCADE module, the third CASCADE module and the fourth CASCADE module are 157 fs, 78.3 fs, 22.6 fs, 7.2 fs and 3.1 fs, respectively. The transform-limited pulse durations $τ_{TL}$ of the light pulses from the beginning to the first CASCADE module, the second CASCADE module, the third CASCADE module and the fourth CASCADE module are 146 fs, 72.9 fs, 21.1 fs, 5.7 fs and 3.0 fs, respectively. As shown in FIGS. 3D, 3F, 3H, 3J and 3L, the waveforms of the light pulses can be gradually and efficiently compressed by the cascaded focusing and compressing postcompression system 300.

Figure 4:
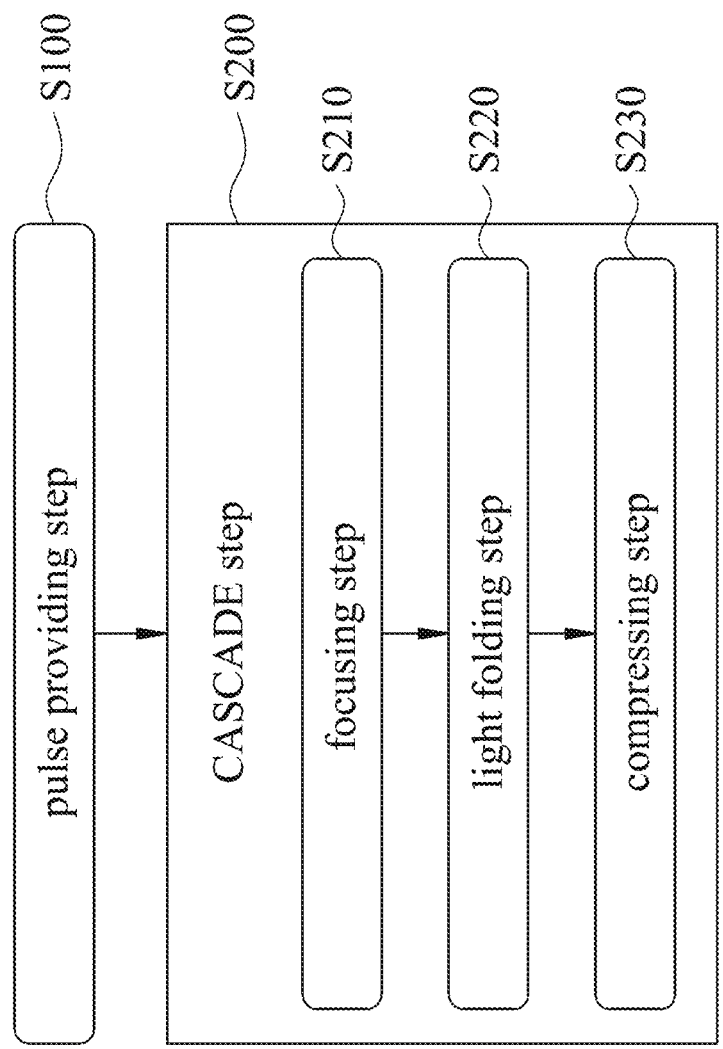
FIG. 4 shows a block diagram of a cascaded focusing and compressing postcompression method according to a 4th embodiment of the present disclosure.

FIG. 4 shows a block diagram of a cascaded focusing and compressing postcompression method 10 according to a 4th embodiment of the present disclosure. As shown in FIG. 4, the cascaded focusing and compressing postcompression method 10 includes a pulse providing step S100, and a CASCADE step S200. The pulse providing step S100 is performed to provide light pulses. The CASCADE step S200 is performed to dispose at least one CASCADE module for focusing and compressing the light pulses and includes a focusing step S210 and a compressing step S230. The focusing step S210 is performed to nonlinear broaden a bandwidth of the light pulses via a focusing unit of the at least one CASCADE module, wherein a light path of the light pulses passes through the focusing unit. The compressing step S230 is performed to shorten a pulse duration of the light pulses via a compressing unit of the CASCADE module. The CASCADE module, the focusing unit and the compressing unit can be the aforementioned of the CASCADE module, the focusing unit and the compressing unit according to the 1st to 3rd embodiments, but the present disclosure is not limited thereto. Hence, the light pulses with large bandwidth and high energy can be provided.

Moreover, the CASCADE step S200 can further include a light folding step S220. The light folding step S220 is performed to fold a light path of the light pulses in focusing elements or compressing units. The focusing element can be the aforementioned focusing elements according to the 1st to 3rd embodiments, but the present disclosure is not limited thereto. Hence, a space usage can be reduced.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A cascaded focusing and compressing postcompression system, light pulses passing through the cascaded focusing and compressing postcompression system, and comprising: at least one CASCADE (cascaded focusing and compressing) module, comprising:
a focusing unit for nonlinear broadening a bandwidth of the light pulses; and
a compressing unit for shortening a pulse duration of the light pulses;
wherein the focusing unit comprises a medium, the medium is filled with a gas, and the light pulses propagate in and leave the medium in one single focusing geometry without wave guiding or multiple reflections.

2. The cascaded focusing and compressing postcompression system of claim 1, wherein the compressing unit comprises at least one chirped mirror.

3. The cascaded focusing and compressing postcompression system of claim 1, further comprising:
a focusing element for focusing the light pulses.

4. The cascaded focusing and compressing postcompression system of claim 3, wherein a number of the at least one CASCADE module is at least two, and the CASCADE modules are arranged side by side along a direction parallel to an emission direction of the light pulses, and a light path of the light pulses is folded in direction of zigzag.

5. The cascaded focusing and compressing postcompression system of claim 1, wherein the gas is noble gas.

6. The cascaded focusing and compressing postcompression system of claim 1, wherein a pressure of the focusing unit is 10 torr-7600 torr.

7. The cascaded focusing and compressing postcompression system of claim 1, wherein an initial wavelength of the light pulses is between 200 nm-10000 nm.

8. A cascaded focusing and compressing postcompression method, comprising:
performing a pulse providing step to provide light pulses;
performing a CASCADE step to dispose at least one CASCADE module for focusing and compressing the light pulses, and comprising:
performing a focusing step to nonlinear broaden a bandwidth of the light pulses via a focusing unit of the at least one CASCADE module, wherein a light path of the light pulses passes through the focusing unit; and
performing a compressing step to shorten a pulse duration of the light pulses via a compressing unit of the at least one CASCADE module;
wherein the focusing unit comprises a medium, the medium is filled with a gas, and the light pulses propagate in and leave the medium in one single focusing geometry without wave guiding or multiple reflections.

9. The cascaded focusing and compressing postcompression method of claim 8, wherein the compressing unit shortens the pulse duration of the light pulses via at least one chirped mirror.

10. The cascaded focusing and compressing postcompression method of claim 8, further comprising:
performing a light folding step to fold a light path of the light pulses.

11. The cascaded focusing and compressing postcompression method of claim 10, wherein a number of the at least one CASCADE module is at least two, and the CASCADE modules are arranged side by side along a direction parallel to an emission direction of the light pulses, and the light path of the light pulses is folded in direction of zigzag.

12. The cascaded focusing and compressing postcompression method of claim 8, wherein the gas is noble gas.

13. The cascaded focusing and compressing postcompression method of claim 8, wherein a pressure of the focusing unit is 10 torr-7600 torr.

14. The cascaded focusing and compressing postcompression method of claim 8, wherein an initial wavelength of the light pulses is between 200 nm-10000 nm.

* * * * *